United States Patent
Akase

Patent Number: 5,297,531
Date of Patent: Mar. 29, 1994

[54] FUEL SUPPLYING DEVICE FOR INTERNAL COMBUSTION GASOLINE ENGINE

[75] Inventor: Yoshiaki Akase, Hyogo, Japan

[73] Assignee: Mitsubishi Denki Kabushiki Kaisha, Tokyo, Japan

[21] Appl. No.: 994,291

[22] Filed: Dec. 21, 1992

[30] Foreign Application Priority Data

Jan. 7, 1992 [JP] Japan .................................. 4-000903

[51] Int. Cl.⁵ ............................................. F02M 31/00
[52] U.S. Cl. .................................................... 123/549
[58] Field of Search ............... 123/543, 549, 557, 590, 123/531, 533, 547, 552

[56] References Cited

U.S. PATENT DOCUMENTS

| | | | |
|---|---|---|---|
| 4,756,293 | 7/1988 | Suzuki et al. | 123/533 |
| 4,781,164 | 11/1988 | Seeber et al. | 123/533 |
| 4,962,889 | 10/1990 | Halvorsen | 123/590 |
| 4,967,706 | 11/1990 | Van Wechem et al. | |
| 5,048,500 | 9/1991 | Curhan | 123/549 |
| 5,056,495 | 10/1991 | Yamashita et al. | |
| 5,086,747 | 2/1992 | Curhan | 123/549 |
| 5,119,794 | 6/1992 | Kushida et al. | 123/549 |
| 5,134,986 | 8/1992 | Curhan | 123/549 |
| 5,154,154 | 10/1992 | Henke et al. | 123/549 |
| 5,172,673 | 12/1992 | Pelgrim et al. | 123/549 |
| 5,179,927 | 1/1993 | Henke et al. | 123/549 |

*Primary Examiner*—Tony M. Argenbright
*Assistant Examiner*—M. Macy
*Attorney, Agent, or Firm*—Sughrue, Mion, Zinn, Macpeak & Seas

[57] ABSTRACT

A fuel supplying device for an internal combustion gasoline engine in which, a loss of air pressure due to the heater is reduced, the heater efficiency is improved, and which is applicable to a multi-point injection system. The fuel supplying device for an internal combustion gasoline engine includes a fuel heating heater 3 provided in the suction pipe 6 of the engine in such a manner that it is extended along the inner wall of the suction pipe 6, so that a loss of air pressure is reduced. One of the plurality of sprays of fuel jetted by a multi-spray type fuel injection valve 7 is applied to the heater, so that the heater efficiency is improved. The fuel injection valve 7 is provided for each of the cylinders of the engine.

3 Claims, 3 Drawing Sheets

SUC.: (SUCTION)
COM.: (COMPRESSION)
EXP.: (EXPLOSION)
EXH.: (EXHAUST)

FUEL SUPPLYING DEVICE FOR INTERNAL COMBUSTION GASOLINE ENGINE

BACKGROUND OF THE INVENTION

This invention relates to a fuel supplying device for an internal combustion gasoline engine.

FIG. 5 shows the arrangement of a conventional fuel supply device for an internal combustion gasoline engine. In FIG. 5, reference numeral 5 designates an engine; 6, a suction pipe of the engine 5; 1, a control valve for controlling the flow rate of air in the suction pipe 6; 2, a fuel injection valve provided upstream of the control valve 1; 3, a heater provided downstream of the control valve, to heat fuel flowing down thereby to accelerate gasification of the fuel; 4, a holder supporting the heater 3; and 8, a suction valve provided at the junction of the engine 5 and the suction pipe 6.

The operation of the fuel supplying device thus constructed will be described. The control valve 1 is so operated (opened or closed) that a quantity of fuel corresponding to the operating condition of the engine 5 is injected through the fuel injection valve 2. The fuel thus injected is sucked into the engine 5 together with air; however, before the fuel reaches the engine 5, gasification of the fuel is accelerated by the heater 3 fixedly supported by the holder 4, so that a mixture gas of fuel and air is formed. The mixture gas thus formed is sucked into in the cylinders of the engine, and burnt there.

In the conventional fuel supplying device thus designed, the heater 3 increases a loss of air pressure. This effect of the heater may be lessened by decreasing its size. However, if the heater 3 is decreased in size, it is rather difficult for the heater 3 to sufficiently heat and gasify the fuel. In addition, the conventional fuel supplying device is disadvantageous in that it is not applicable to a multi-point injection system.

SUMMARY OF THE INVENTION

Accordingly, an object of this invention is to eliminate the above-described difficulties accompanying a conventional fuel supply device for an internal combustion gasoline engine. More specifically, an object of the invention is to provide a fuel supplying device for an internal combustion gasoline engine in which a loss of air pressure attributed to the heater is minimized, and the heater efficiency is increased, and which is applicable to a multi-point injection system.

According to a first aspect of the invention, there is provided a fuel supplying device for an internal combustion gasoline engine which comprises: a heater for heating fuel and which is mounted through a holder on the inner wall of a suction pipe of the engine in such a manner that the heater is extended along the inner wall; and a multispray type fuel injection valve mounted on the suction pipe, the fuel injection valve jetting a plurality of sprays of fuel towards a suction valve provided at the junction of the engine and the suction pipe, and the heater.

According to a second aspect of the invention, there is provided a fuel supplying device for an internal combustion gasoline engine which comprises: the above-described heater; and an air assist type fuel injection valve mounted on the suction pipe, the fuel injection valve jetting a spray of fuel towards a suction valve of the engine, and the heater.

According to a third of the invention, there is provided a fuel supplying device for an internal combustion gasoline engine which comprises: the above-described heater; a first fuel injection valve for jetting fuel towards the heater; and a second fuel injection valve for jetting fuel towards a suction valve of the engine at an injection time later than that of the first fuel injection valve.

In the fuel supply device according to the first aspect of the invention, the fuel heating heater is provided in the suction pipe in such a manner that it is extended along the inner wall of the suction pipe, which reduces the loss of air pressure. The multi-spray type fuel injection valve is employed in such a manner that one of the sprays of fuel jetted thereby is applied to the heater, which improves the heater efficiency.

Furthermore, in the fuel supply device according to the second aspect of the invention, the fuel heating heater is provided in the suction pipe in such a manner that it is extended along the inner wall of the suction pipe, and therefore the loss of air pressure is reduced. With the air assist type fuel injection valve, the angle of a spray of fuel jetted thereby is constant independently of the boost pressure at all times, and the heater efficiency is improved.

Moreover, in the fuel supply device according to the third aspect of the invention, similarly as in the above-described fuel supply devices, the fuel heating heater is provided in the suction pipe in such a manner that it is extended along the inner wall of the suction pipe, whereby the loss of air pressure is decreased, and the first fuel injection valve jets a spray of fuel towards the heater, while the second injection valve jets a spray of fuel towards the suction valve reduced. The fuel injection time of the first fuel injection valve is set earlier than that of the second injection valve, and therefore the spray of fuel jetted by the first fuel injection valve is applied to the engine together with the spray of fuel jetted by the second fuel injection valve.

DETAILED DESCRIPTION OF THE PREFERRED EMBODIMENTS

First Embodiment

Figure 1:
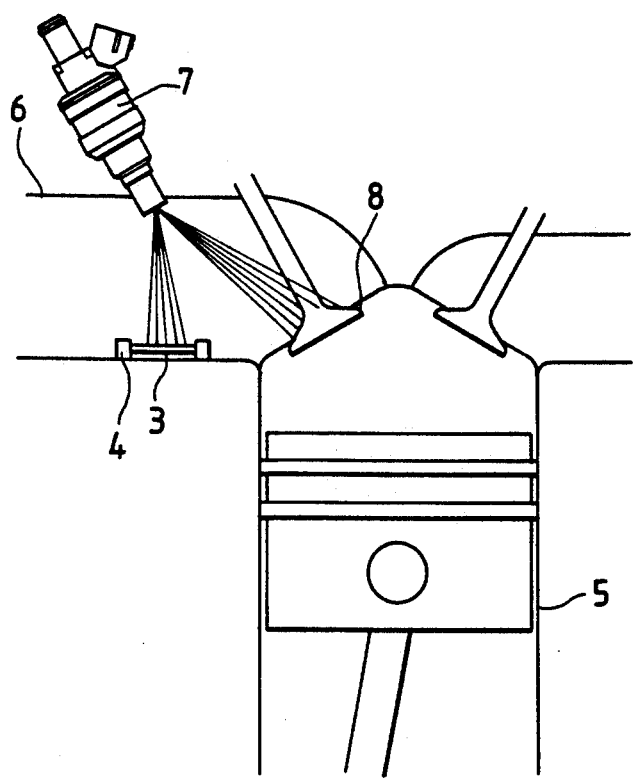
FIG. 1 is an explanatory diagram showing the arrangement of a fuel supplying device for an internal combustion gasoline engine, which constitutes a first embodiment of this invention.
Figure 5:
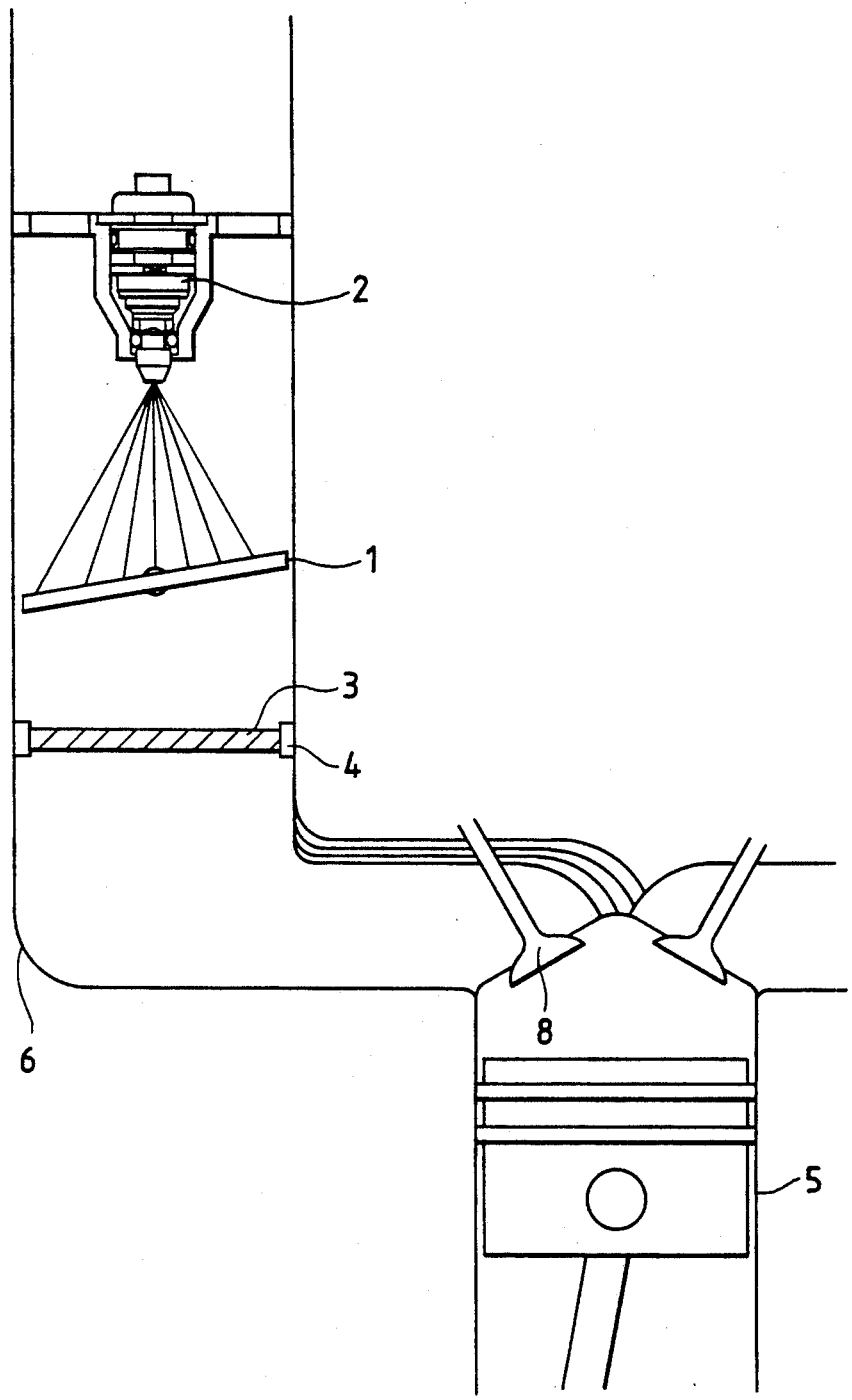
FIG. 5 is an explanatory diagram showing the arrangement of a conventional fuel supplying device for an internal combustion gasoline engine.

A fuel supplying device for an internal combustion gasoline engine, which constitutes a first embodiment of this invention, will be described with reference to FIG. 1. FIG. 1 shows the arrangement of the fuel supplying device of the invention. The fuel supplying device, similarly as in the conventional device shown in FIG. 5, has a control valve 1 (not shown). In FIG. 1, reference numeral 3 designates a heater provided for each of the cylinders, the heater 3 being mounted through a holder 4 on the inner wall of a suction pipe 6 in such a manner that it is extended along the inner wall; 8, a suction valve provided at the junction of the engine 5 and the suction pipe 6; and 7, a multi-spray type fuel injection valve provided for each of the cylinders, the fuel injection valve 7 jetting fuel towards the fuel heating heater 3 and the suction valve 8.

The operation of the fuel supplying device thus designed will be described. The fuel injection valve 7 jets a plurality of sprays of fuel according to the operating condition of the engine 5. More specifically, one of the sprays of fuel is jetted towards the heater 3, and the remaining towards the suction valve 8.

In the first embodiment, gasification of fuel is accelerated by jetting it, as a result of which the combustion of fuel in the engine 5 is improved, the quantity of exhaust gas decreases, and the rate of fuel consumption is improved. In addition, since the heater 3 is provided along the inner wall of the suction pipe 6, the loss of air pressure is minimized. One of the sprays of fuel jetted is directed towards the heater 3 at all times, which improves the heater efficiency. Furthermore, the remaining sprays of fuel are applied to the suction valve 8, so that fuel is sucked into the engine before gasified, which improves the start characteristic of the engine. It goes without saying that the fuel supplying device is applicable to the multipoint injection system.

Second Embodiment

Figure 2:
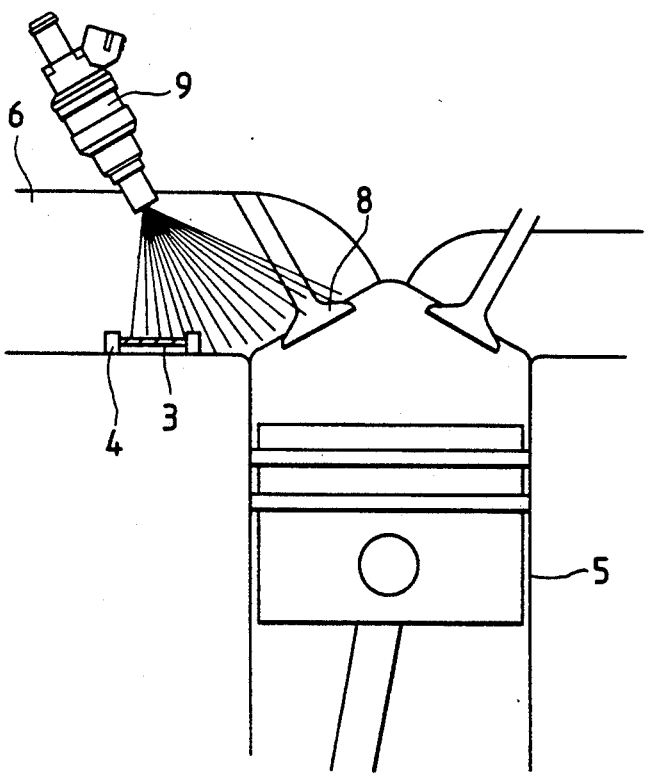
FIG. 2 is an explanatory diagram showing the arrangement of another fuel supplying device for an internal combustion gasoline engine, which constitutes a second embodiment of this invention.

FIG. 2 shows another fuel supplying device for an internal combustion gasoline engine, which constitutes a second embodiment of the invention. In FIG. 2, reference numeral 9 designates an air assist type fuel injection valve provided for each of the cylinders of the engine. The fuel injection valve 9 jets a spray of fuel covering a heater 3 and a suction valve 8. The other arrangements are equal to those of the first embodiment shown in FIG. 1. As was described above, the fuel injection valve 9 jets a spray of fuel covering the heater 3 and the suction valve 8. A part of the spray of fuel, being heated by the heater 3, is accelerated in gasification.

In the second embodiment, the fuel injection valve 9 is of the air assist type in which a spray angle is substantially maintained unchanged independently of the boost pressure. Therefore, the spray of fuel jetted by the fuel injection valve 9 is allowed to blow against the heater 3 under all operating conditions of the engine, so that the heater efficiency is improved. The other effects are the same as those of the first embodiment.

Third Embodiment

Figure 3:
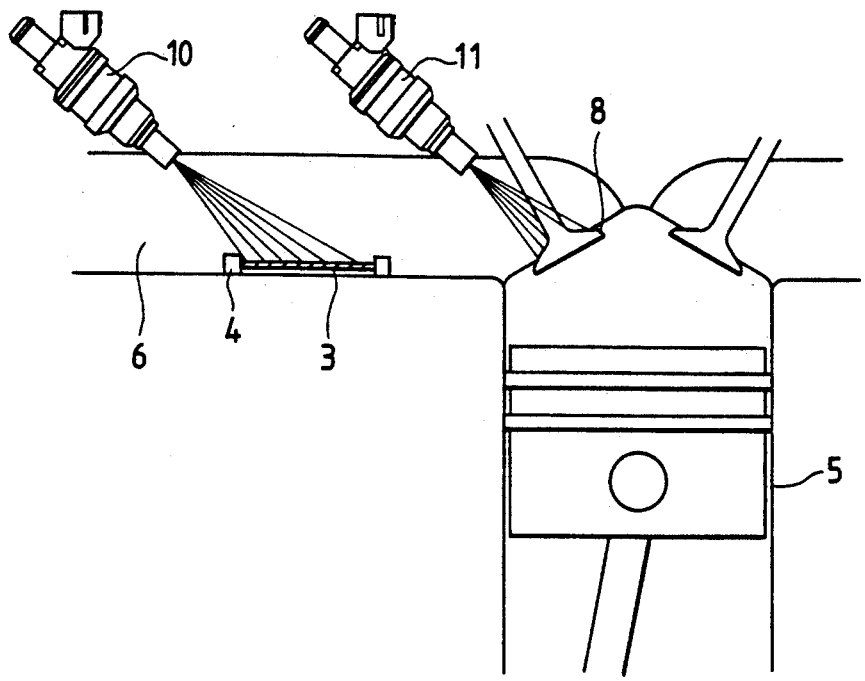
FIG. 3 is an explanatory diagram showing the arrangement of another fuel supplying device for an internal combustion gasoline engine, which constitutes a third embodiment of this invention.

A third embodiment of the invention is as shown in FIG. 3. In FIG. 3, reference numeral 10 designates a first fuel injection valve (INJ1) provided in the suction pipe 6 and for each of the cylinder. The first fuel injection valve 10 is adapted to jet fuel towards the heater 3 the quantity of which is in a predetermined proportion to the quantity of fuel corresponding to the operating condition of the engine in a predetermined proportion. Further in FIG. 3, reference numeral 11 designates a second fuel injection valve (INJ2) which is also provided in the suction pipe 6 and for each of the cylinders. The second fuel injection valve 11 is adapted to jet fuel towards the suction valve 8 so as to supplement the fuel jetted by the first fuel injection valve 10. The other arrangements are the same as those of the above-described first and second embodiments.

Now, the operation of the fuel supplying device thus constructed will be described. The first fuel injection valve 10 jets fuel the quantity of which is in a predetermined proportion to the quantity of fuel corresponding to the operating condition of the engine 5. The fuel thus jetted is applied to the heater 3, where it is heated; that is, gasification of the fuel is accelerated by the heater. The fuel thus processed is sucked into the cylinders of the engine 5. On the other hand, the second fuel injection valve 11 jets fuel towards the suction valve 8 to supplement the fuel jetted by the first fuel injection valve 10.

Figure 4:
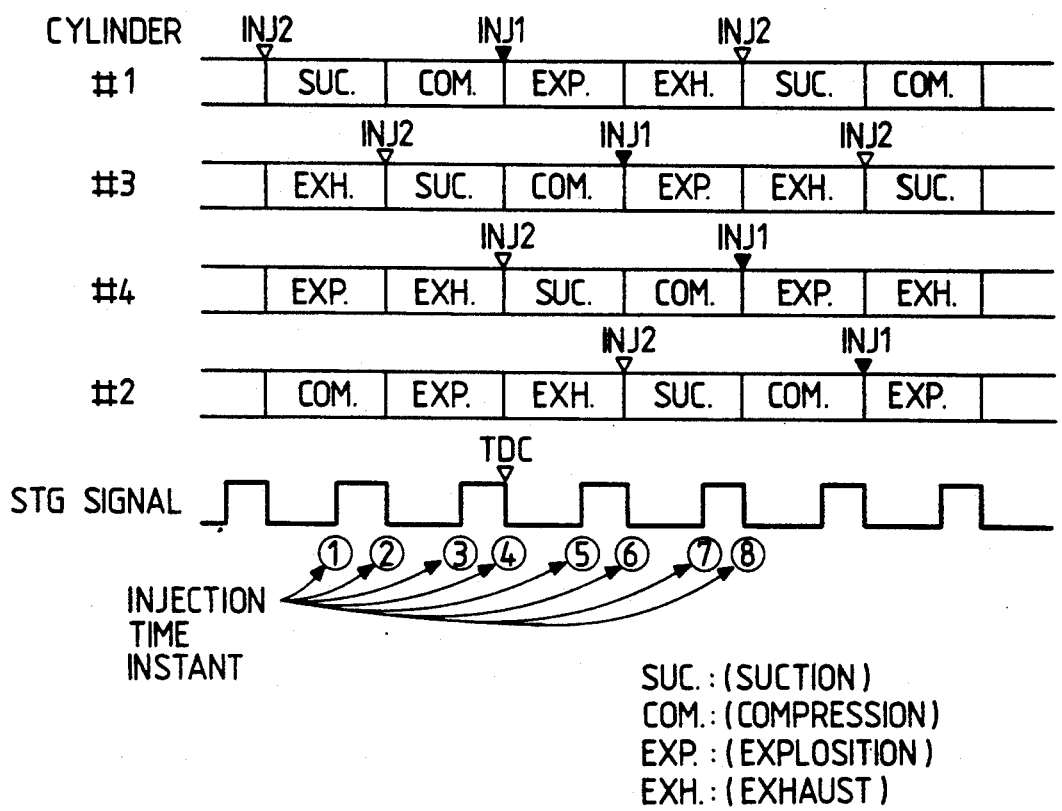
FIG. 4 is a timing chart showing fuel injection time instants of the fuel supplying device shown in FIG. 3.

The fuel injection timing of the first and second fuel injection valves 10 and 11 will be described with reference to FIG. 4. Let us consider the injection of fuel into No. 1 cylinder by way of example. The first fuel injection valve 10 jets fuel towards the heater 3. In order to lengthen the time of gasification of fuel, the fuel injection time of the first fuel injection valve 10 should occur as early as possible relative to a suction stroke. Accordingly, in determining the fuel injection timing in synchronization with an SGT signal, the fuel injection time should be close to the injection time instant (1) in FIG. 4. However, at the fuel injection time instants (1) and (2), blow-by may occur. Therefore, it is preferable that the fuel injection time of the first fuel injection valve is close to the injection time instant (3) or (4). With the fuel injection valve 2 taken into consideration, it is recommended that the fuel injection time of the first fuel injection valve occurs at the injection time instant (4). The second fuel injection valve 11 is to jet fuel to supplement the fuel jetted by the first fuel injection valve 10. Therefore, in order to make the injection of fuel by the second fuel injection valve 11 most effective, the latter 11 should jet fuel at the injection time instant (8). On the other hand, it is performed by the second fuel injection valve 11 to temporarily increase the quantity of fuel to be supplied to the engine during transition.

In the third embodiment, the provision of the heater 3 along the inner wall of the suction pipe 6 minimizes the loss of air pressure, and accelerates the gasification of fuel. Furthermore, in the third embodiment, with the time required for gasifying fuel taken into account, the fuel injection time of the first fuel injection valve 10 is so determined as to occur earlier than that of the second fuel injection valve 11. As a result, the combustion of fuel in the engine is improved, and the quantity of exhaust gas is decreased, and the rate of fuel consumption is improved.

As is apparent from the above description, in the fuel supplying device according to the first aspect of the invention, the fuel injection valve jets a plurality of sprays of fuel, as a result of which gasification of fuel is accelerated, the quantity of exhaust gas is decreased, and the rate of fuel consumption is improved. Furthermore, the heater is provided along the inner wall of the suction pipe, which reduces the loss of air pressure. One of the plurality of sprays of fuel jetted by the fuel injection valve is applied to the heater, so that the heater efficiency is improved. It goes without saying that the fuel supplying device thus designed is applicable to the multi-point injection system.

In the fuel supplying device according to the second aspect of the invention, the air assist type fuel injection valve is employed so that a spray of fuel is jetted towards the heater at all times with the spray angle maintained unchanged, which improves the heater efficiency.

In the fuel supplying device according to the third aspect of the invention, the first fuel injection valve jets a spray of fuel towards the heater, while the second fuel injection valve jets a spray of fuel towards the suction valve. The fuel injection time of the first fuel injection valve is shifted from that of the second fuel injection valve so that the spray of fuel jetted by the former is sucked into the engine together with the spray of fuel jetted by the latter. Therefore, both the heater efficiency and the combustion efficiency are improved, the quantity of exhaust gas is decreased, and the rate of fuel consumption is improved.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. A fuel supplying device for an internal combustion gasoline engine, comprising:
   a suction pipe of said engine;
   a suction valve provided at the junction of said engine and said suction pipe;
   a heater, for heating fuel, which is mounted through a holder on an inner wall of said suction pipe in such a manner that said heater is extended along said inner wall; and
   a fuel injection valve means for jetting a plurality of sprays of said fuel towards at least said suction valve and said heater, wherein said fuel injection valve means comprises:
   a multi-spray type fuel injection valve mounted on said suction pipe, said fuel injection valve jetting at least two discrete sprays of fuel, with one of said sprays being jetted towards said heater and another of said sprays being jetted towards said suction valve.

2. A fuel supplying device for an internal combustion gasoline engine, comprising:
   a suction pipe of said engine;
   a suction valve provided at the junction of said engine and said suction pipe;
   a heater, for heating fuel, which is mounted through a holder on an inner wall of said suction pipe in such a manner that said heater is extended along said inner wall; and
   a fuel injection valve means for jetting a plurality of sprays of said fuel towards at least said suction valve and said heater, wherein said fuel injection valve means comprises:
   a first fuel injection valve mounted on said suction pipe for jetting a spray of fuel towards said heater; and
   a second fuel injection valve mounted on said suction pipe for jetting a spray of fuel towards said suction valve.

3. A fuel supplying device for an internal combustion gasoline engine, comprising:
   a suction pipe of said engine;
   a suction valve provided at the junction of said engine and said suction pipe;
   a heater, for heating fuel, which is mounted through a holder on an inner wall of said suction pipe in such a manner that said heater is extended along said inner wall; and
   a fuel injection valve means for jetting a plurality of sprays of said fuel towards at least said suction valve and said heater, wherein said fuel injection valve means comprises:
   a first fuel injection valve mounted on said suction pipe for jetting a spray of fuel towards said heater; and
   a second fuel injection valve mounted on said suction pipe for jetting a spray of fuel towards said suction valve, wherein said second fuel injection valve jets a spray of fuel towards said suction valve at an injection time which is later than that of said first fuel injection valve.

* * * * *